(12) United States Patent
Tremmel et al.

(10) Patent No.: US 7,900,792 B2
(45) Date of Patent: Mar. 8, 2011

(54) DEVICE FOR COMPRISING A RELEASABLE LATCH CONNECTION

(75) Inventors: Günter Tremmel, Schwörstadt (DE); Alain Kupek, Wittenheim (FR); Ronnie Weissenfeld, Efringen-Kirchen (DE); Gisela Kaltenpoth, Eschborn (DE)

(73) Assignee: A. Raymond Et Cie, Grenoble (FR)

( * ) Notice: Subject to any disclaimer, the term of this patent is extended or adjusted under 35 U.S.C. 154(b) by 490 days.

(21) Appl. No.: 11/997,628

(22) PCT Filed: Jun. 22, 2006

(86) PCT No.: PCT/EP2006/005996
§ 371 (c)(1),
(2), (4) Date: Apr. 28, 2008

(87) PCT Pub. No.: WO2007/017006
PCT Pub. Date: Feb. 15, 2007

(65) Prior Publication Data
US 2008/0245798 A1      Oct. 9, 2008

(30) Foreign Application Priority Data

Aug. 5, 2005   (DE) .......................... 10 2005 036 904

(51) Int. Cl.
*B65D 45/16* (2006.01)
*B65D 45/22* (2006.01)
(52) U.S. Cl. .......................... 220/326; 220/281; 220/324
(58) Field of Classification Search .................. 220/326, 220/324, 281, 283
See application file for complete search history.

(56) References Cited

U.S. PATENT DOCUMENTS

| 3,843,013 A | 10/1974 | Brooks, Jr. |
| 4,500,008 A | 2/1985 | Cook |

(Continued)

FOREIGN PATENT DOCUMENTS

DE            9312585 U1       8/1994

(Continued)

OTHER PUBLICATIONS

International Preliminary Report on Patentability mailed Feb. 5, 2008 in priority application No. PCT/EP2006/005996 and its English translation.

*Primary Examiner* — Anthony Stashick
*Assistant Examiner* — Niki M Eloshway
(74) *Attorney, Agent, or Firm* — Baker & Daniels LLP

(57) ABSTRACT

Disclosed is a device comprising a base part (2) and a top part (7) that can be joined to the base part (2) via a releasable locking connection (16). The locking connection (16) is provided with at least one catch (18, 19) that is attached to a locking web (20) and engages with a thrust bearing section (21) in a closed position, and a releasing mechanism which acts upon the locking connection (16) and causes the engagement of the or each catch (18, 19) to be canceled when being actuated. The locking connection (16) is also provided with a flexible pressure latch (11) which is recessed in the top part (7). A latch rib (15), under the effect of which the engagement of the or each catch (18, 19) is canceled, is molded onto the side of the pressure latch (11) facing the or each catch (18, 19), whereby a very simple and safe mechanical structure is obtained, resulting in a relatively low production cost.

4 Claims, 2 Drawing Sheets

U.S. PATENT DOCUMENTS

| | | | |
|---|---|---|---|
| 4,901,882 A * | 2/1990 | Goncalves | 220/324 |
| 5,131,558 A * | 7/1992 | Hiromori | 220/326 |
| 5,135,126 A * | 8/1992 | Petit | 220/326 |
| 5,156,293 A * | 10/1992 | Petterson et al. | 220/326 |
| 5,682,910 A * | 11/1997 | Kizawa et al. | 132/293 |
| 5,706,968 A | 1/1998 | Riley | |
| 6,779,681 B2 * | 8/2004 | Doerfler et al. | 220/835 |
| 7,621,420 B2 * | 11/2009 | Bandoh et al. | 220/326 |
| 7,654,411 B2 * | 2/2010 | Boots et al. | 220/835 |
| 7,735,665 B2 * | 6/2010 | Robinson | 215/237 |

FOREIGN PATENT DOCUMENTS

| | | |
|---|---|---|
| EP | 1078862 A2 | 2/2001 |
| GB | 646603 | 11/1950 |

\* cited by examiner

DEVICE FOR COMPRISING A RELEASABLE LATCH CONNECTION

BACKGROUND OF THE INVENTION

1. Field of the Invention

The present invention provides a device including a releasable latch connection.

2. Description of the Related Art

One known device is disclosed in DE 92 12 585 U1. In this device, a body part and a cover part are joined to each other via a releasable latch connection. The latch connection is provided with a latch hook that can be unlocked by means of a tab. The latch hook can be fixed by means of a slide to keep it from accidentally coming unfastened. This device is of comparatively complex construction, however, and is therefore relatively expensive to make.

SUMMARY OF THE INVENTION

The present invention provides a device including a releasable latch connection that is distinguished by comparatively simple construction and is relatively inexpensive to make.

The fact that the flexible push tab that is to be actuated in order to release the rear engagement of the latch hook is relieved into the cover part and has formed onto it a tab rib that acts on the latch hook results in very simple and operationally reliable mechanical construction, thus making for comparatively inexpensive production.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
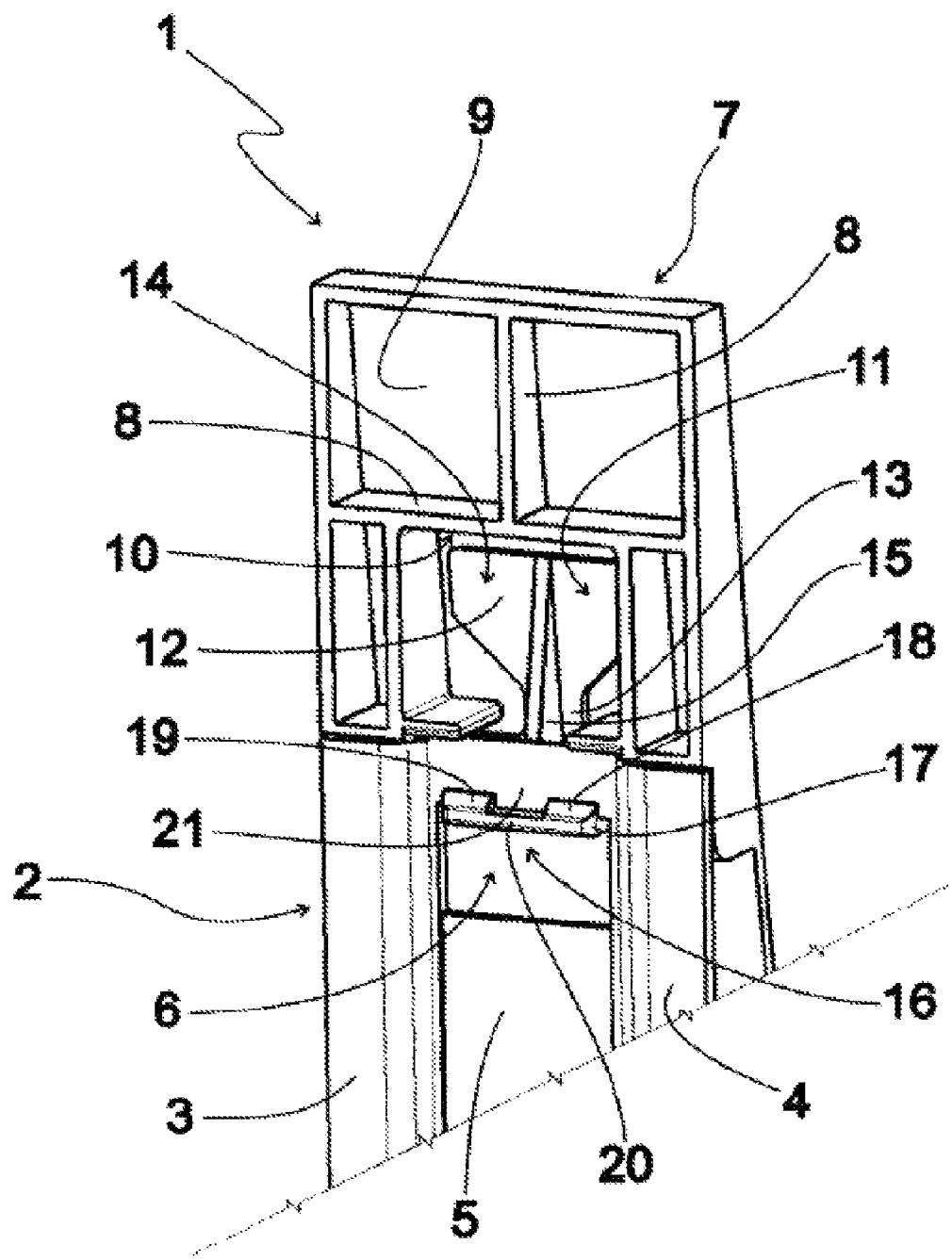
FIG. 1 is a perspective view of an exemplary embodiment of a device according to the invention in the region of a latch connection.

Corresponding reference characters indicate corresponding parts throughout the several views. Although the exemplification set out herein illustrates an embodiment of the invention, the embodiment disclosed below is not intended to be exhaustive or to be construed as limiting the scope of the invention to the precise forms disclosed.

DETAILED DESCRIPTION

FIG. 1 is a perspective view of an exemplary embodiment of a device according to the invention in the form of a cable conduit 1, which is depicted FIG. 1 as a tongue-like end region. Cable conduit 1 comprises a body part 2, which is configured with a back wall having two outer portions 3, 4 disposed at the edges and a middle portion 5 disposed between said outer portions 3, 4. Middle portion 5 is configured in its end region with a penetrating-engagement opening 6 and is offset from outer portions 3, 4 in the direction of a cover part 7 of cable conduit 1.

Cover part 7 is configured in its end region depicted in FIG. 1 with a cover face 9 that is reinforced with a number of reinforcing ribs 8. Wrought from cover face 9 by the production of a relief 10 is a longitudinally flexible push tab 11 of a release mechanism, having a relatively broad tab head 12 and a tab web 13 that is narrower than said tab head 12. Configured in cover part 7 on the side of push tab 11 facing toward body part 2 is a tab space 14 into which push tab 11 can sink. Formed in the longitudinal direction of push tab 12, on its side that faces toward body part 2, is a tab rib 15 that rises from the side of push tab 11 facing toward body part 2, beginning at tab head 12 and extending with increasing height in the direction of tab web 13.

Also apparent in FIG. 1 is a latch connection 16 comprising a latch hook 17 with formed-on latch lugs 18, 19, which in the arrangement according to FIG. 1 pass through penetrating-engagement space 6 and engage behind an abutment portion 21 that is part of middle portion 5 and extends edgewise in the transverse direction. The latch lugs 18, 19 are attached to a latch web 20 of latch hook 17.

Figure 2:
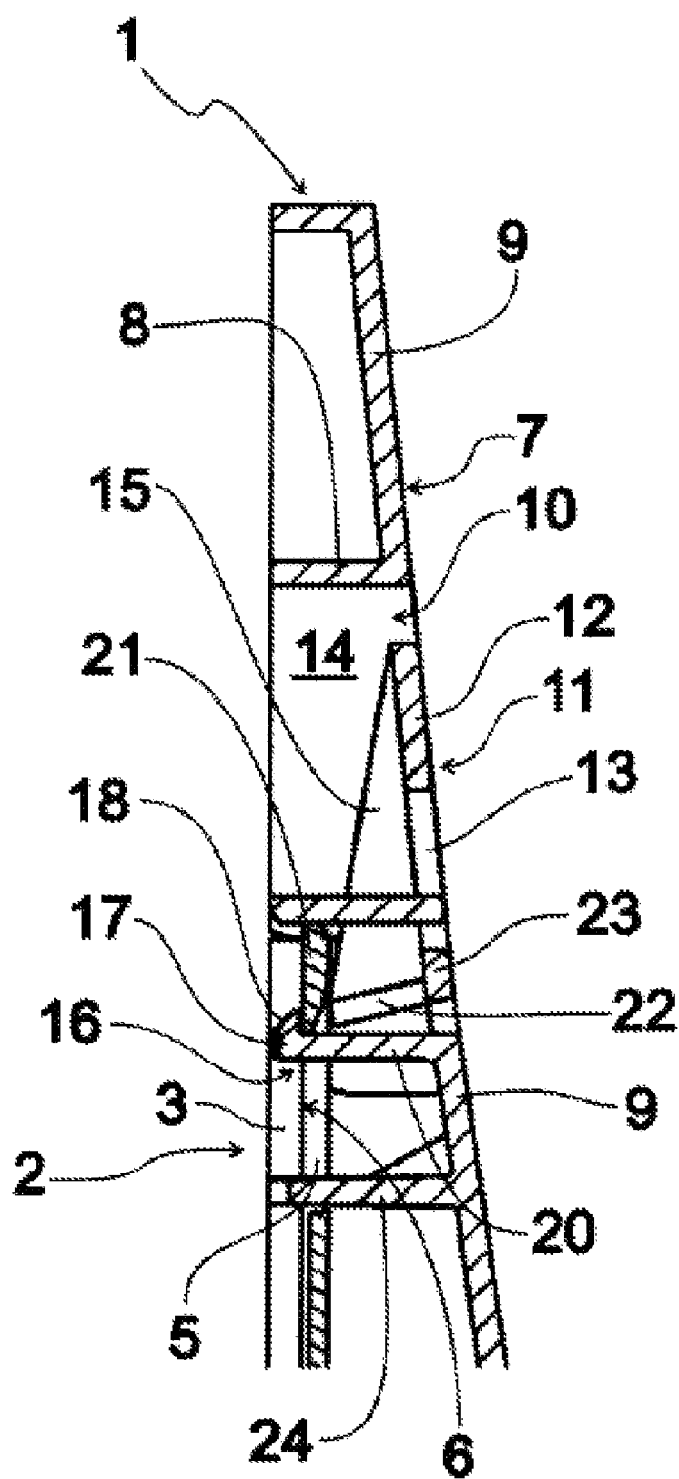
FIG. 2 is a section through another exemplary embodiment in the region of the latch connection.

FIG. 2 shows in section a further exemplary embodiment of an inventive device configured in substantially the same manner as the inventive device according to FIG. 1, like elements of the inventive devices according to FIG. 1 and FIG. 2 being provided with the same respective reference numerals. It can be seen from FIG. 2 that tab rib 15 extends from tab head 12 to behind the side of abutment portion 21 facing toward cover part 7, and that an actuating plunger 22 is formed onto the end of tab rib 15 that faces toward latch connection 16. It can further be understood from FIG. 2 that push tab 11 is flexibly tethered by means of twistable link portions 23 extending on both sides of tab web 13. In the inventive device according to FIG. 2, a bracing tongue 24 that is formed onto cover face 9 extends through penetrating-engagement opening 6 on the opposite side from latch web 20 and reaches to the back side of cable conduit 2, to brace the cover face 9 when pressure is exerted on tab head 12. The bracings tongue also serves to prevent, insofar as possible, or at least to hinder, the accidental detachment of cover part 7 when a force is exerted on cover part 7 in the direction of body part 2.

It can be appreciated in particular from FIG. 2 that in the idle position depicted in FIG. 2, actuating plunger 22 is spaced apart from latch web 20 belonging to latch connection 16 and carrying latch hooks 17, 18, such that the rear engagement of latch lugs 18, 19 is not released merely by pressing push tab 11 only slightly into tab space 14, but only by moving latch tab 11 over a path that closes the gap between actuating plunger 22 and latch web 20 and corresponds to the height of latch lugs 18, 19.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A latching device, comprising:
a body part; and
a cover part connectable to said body part via a releasable latch connection, said latch connection comprising:

at least one latch lug attached to a latch web of said cover part, said latch lug engagable behind an abutment portion of said body part; and a release mechanism actuable to release the latch lug from said abutment portion, including a flexible push tab relieved into said cover part and having, on a side thereof facing toward said latch lug, a tab rib engageable with said latch web to release said latch lug, said push tab further including, at and end thereof facing toward said latch web, an actuating plunger extending transversely to said push tab and engageable with said latch web.

2. The device of claim 1, wherein said push tab comprises a relatively broad tab head and a latch web formed onto said tab head that is narrower than said tab head, and wherein an end of said latch web that is directed away from said tab head is flexibly connected to said cover part via at least one twistable link portion.

3. The device of claim 1 wherein, in an idle position, a clearance is disposed between said actuating plunger and said latch web.

4. The device of claim 1, wherein said abutment portion is disposed between two edgewise-disposed outer portions of said body part and is offset therefrom in a direction of said cover part at least far enough that an end of said latch lug that is engageable with said abutment portion is disposed inwardly of a plane defined by said outer portions.

* * * * *